US012671660B2

(12) United States Patent
Li

(10) Patent No.: US 12,671,660 B2
(45) Date of Patent: Jun. 30, 2026

(54) PORT STATE HANDLING IN WIRELESS COMMUNICATIONS

(71) Applicant: ZTE Corporation, Shenzhen (CN)

(72) Inventor: Zhendong Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 269 days.

(21) Appl. No.: 18/113,279

(22) Filed: Feb. 23, 2023

(65) Prior Publication Data

US 2023/0208773 A1 Jun. 29, 2023

Related U.S. Application Data

(63) Continuation of application No. PCT/CN2020/118870, filed on Sep. 29, 2020.

(51) Int. Cl.
H04L 47/28 (2022.01)
H04L 47/32 (2022.01)

(52) U.S. Cl.
CPC .............. H04L 47/28 (2013.01); H04L 47/32 (2013.01)

(58) Field of Classification Search
CPC ..... H04L 47/28; H04L 47/32; H04L 41/0895; H04L 43/065; H04L 41/0816; H04L 41/0894
See application file for complete search history.

(56) References Cited

U.S. PATENT DOCUMENTS

| | | | | |
|---|---|---|---|---|
| 11,468,425 | B1 * | 10/2022 | Suthar ..................... | G06Q 20/24 |
| 2016/0173267 | A1 * | 6/2016 | Zhang ................... | H04L 7/0008 |
| | | | | 709/248 |

| | | | | |
|---|---|---|---|---|
| 2018/0062780 | A1 * | 3/2018 | Shimizu ............... | H04N 21/242 |
| 2020/0267785 | A1 | 8/2020 | Peyman | |
| 2021/0226902 | A1 * | 7/2021 | Li ........................ | H04L 41/0895 |
| 2021/0266085 | A1 * | 8/2021 | Evans .................... | H04J 3/0667 |
| 2021/0288784 | A1 * | 9/2021 | Neugeboren ......... | H04J 3/0667 |
| 2022/0046570 | A1 * | 2/2022 | Moon ................... | H04J 3/0667 |
| 2022/0060970 | A1 * | 2/2022 | Zhu ....................... | H04L 45/566 |

(Continued)

FOREIGN PATENT DOCUMENTS

| | | |
|---|---|---|
| CN | 110611924 A | 12/2019 |
| WO | 2020/103842 A1 | 5/2020 |
| WO | WO 2020/104953 A1 | 5/2020 |

OTHER PUBLICATIONS

International Search Report issued in PCT/CN2020/118870, dated Jun. 24, 2021, 3 pages.

(Continued)

*Primary Examiner* — Phuoc H Nguyen
*Assistant Examiner* — Steven C Nguyen
(74) *Attorney, Agent, or Firm* — Crowell & Moring LLP

(57) ABSTRACT

The present document relates to methods, systems, and devices related to digital wireless communication, and more specifically, to techniques related to port state handling. In one exemplary aspect, a method for data communication is described. The method includes deriving, by a first network function, port state information for a data transmission session based on information included in an announcement message received by the first network function. The method can also include performing, by the first network function a subsequent action based on the derived port state information.

6 Claims, 10 Drawing Sheets

(56)     References Cited

U.S. PATENT DOCUMENTS

2022/0286904  A1 *   9/2022   Ihlar   ................   H04W 28/0268
2023/0087000  A1 *   3/2023   Fang   ................   H04W 28/0831
                                                              370/235

OTHER PUBLICATIONS

3GPP. "System architecture for the 5G System (SGS)" *3GPP TS 23.501 V1651*, Aug. 3, 2020 (Aug. 3, 2020), clauses 5.8.2.8.1, 5.28.3.2.
3GPP. "Study on enhanced support of Industrial Internet of Things (IIoT) in the 5G System 2, (5GS)" *3GPP TR 23. 700-20 V0.5.0*, Sep. 9, 2020 (Sep. 9, 2020), clause 6.1.3.3.
Supplementary European Search Report issued in European Application No. 20955541.6 dated Sep. 4, 2023 (15 pages).
ZTE, "KI#1, new sol, new solution to support the BMCA", SA WG2 Meeting #S2-140E, S2-2005993, Aug. 19, 2020 (8 pages).

Time-Sensitive Networking Task Group of IEEE 802.1, "Timing and Synchronization for Time-Sensitive Applications", IEEE P802. 1AS-Rev/D4.3, Draft Standard for Local and Metropolitan Area Networks, LAN/MAN Standards Committee of the IEE Computer Society, Jan. 13, 2017, (400 pages).
Korean Office Action issued in KR Application No. 10-2023-7006624 dated Mar. 9, 2026, including English translation (16 pages).
3GPP TR 23.700-20 V0.5.0, 3rd Generation Partnership Project; Technical Specification Group Services and System Aspects; Study on enhanced support of Industrial Internet of Things (IIoT) in the 5G System (5GS) (Release 17), Sep. 2020, cls. 6.1.1, 6.1.3, 6.4.2, 6.7.2, 6.7.3, and 6.17 (80 pages).
3GPP TS 23.501 V16.5.1, 3rd Generation Partnership Project; Technical Specification Group Services and System Aspects; System architecture for the 5G System (5GS); Stage 2 (Release 16), Aug. 2020, cl. 5.6.7 (435 pages).

\* cited by examiner

DERIVE PORT STATE INFORMATION FOR A DATA TRANSMISSION SESSION BASED ON INFORMATION INCLUDED IN AN ANNOUNCEMENT MESSAGE RECEIVED BY THE FIRST NETWORK FUNCTION ⌐ 802

PERFORM A SUBSEQUENT ACTION BASED ON THE DERIVED PORT STATE INFORMATION ⌐ 804

800

PORT STATE HANDLING IN WIRELESS COMMUNICATIONS

This application is a continuation application of PCT International Application No. PCT/2020/118870, filed with the China National Intellectual Property Administration, PRC on Sep. 29, 2020, which is herein incorporated by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to port state handling.

In one exemplary aspect, a method for data communication is disclosed. The method includes deriving, by a first network function, port state information for a data transmission session based on information included in an announcement message received by the first network function. The method can also include performing, by the first network function, a subsequent action based on the derived port state information.

In another exemplary aspect, a method for data communication is disclosed. The method includes receiving, by a second network function, port state information from a first network function for a data transmission session, wherein the derived port state information includes grand master clock data. The method can also include sending, by the second network function, a request message to the first network function, the request message including a rule for the data transmission session.

In yet another exemplary aspect, a method for data communication is disclosed. The method includes deriving, by the first network function, port state information for a data transmission session based on a pre-installed rule received from a second network function. The method can also include performing, by the first network function, either activating or deactivating the pre-installed rule for the data transmission session based on the derived port state information.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

In a time sensitive network (TSN), all entities can keep time synchronization with a TSN grand master (GM) clock. In order to achieve this, the Best Master Clock Algorithm (BMCA) can be used to create the time synchronization spanning tree and determine the GM clock. With BMCA, the TSN Bridge can determine the GM clock information, and port state of every port of the TSN Bridge. There may be two methods for BMCA: either a static configuration (external configuration method in TSN specification 802.1AS) or a dynamic computation.

In many cases, the 5G system can support the IEEE TSN traffic. It has been agreed that 5GS can be enhanced to be as a TSN virtual bridge, i.e. from TSN network perspective, the 5GS looks like a TSN bridge entity.

In many cases, the static configuration can be used for BMCA, i.e. all the ports in the DS-TT/UE side are statically configured with master state, and one of NW-TT is configured with a slave state. Further, the GM master information can also be configured in the NW-TT.

However, this can limit the availability for 5GS supporting TSN. It can only work when the TSN network which uses the Static configuration. When the TSN network uses the dynamic BMCA, the 5G network may be unable to support this TSN scenario.

In one TSN network, there can be a Grand Master clock. All the TSN entities (e.g. TSN end station, TSN Bridge, etc) may be time synchronized with TSN master clock. This can indicate that the all the TSN entities within one TSN network has the same clock.

In the IEEE, there may be two specification using BMCA: IEEE 1588, which can use the PTP message to implement the BMCA or IEEE 802.1AS, which can use the gPTP message to implement the BMCA. Both PTP and gPTP can use the Announce message to achieve the dynamic BMCA between all the nodes.

Figure 1:
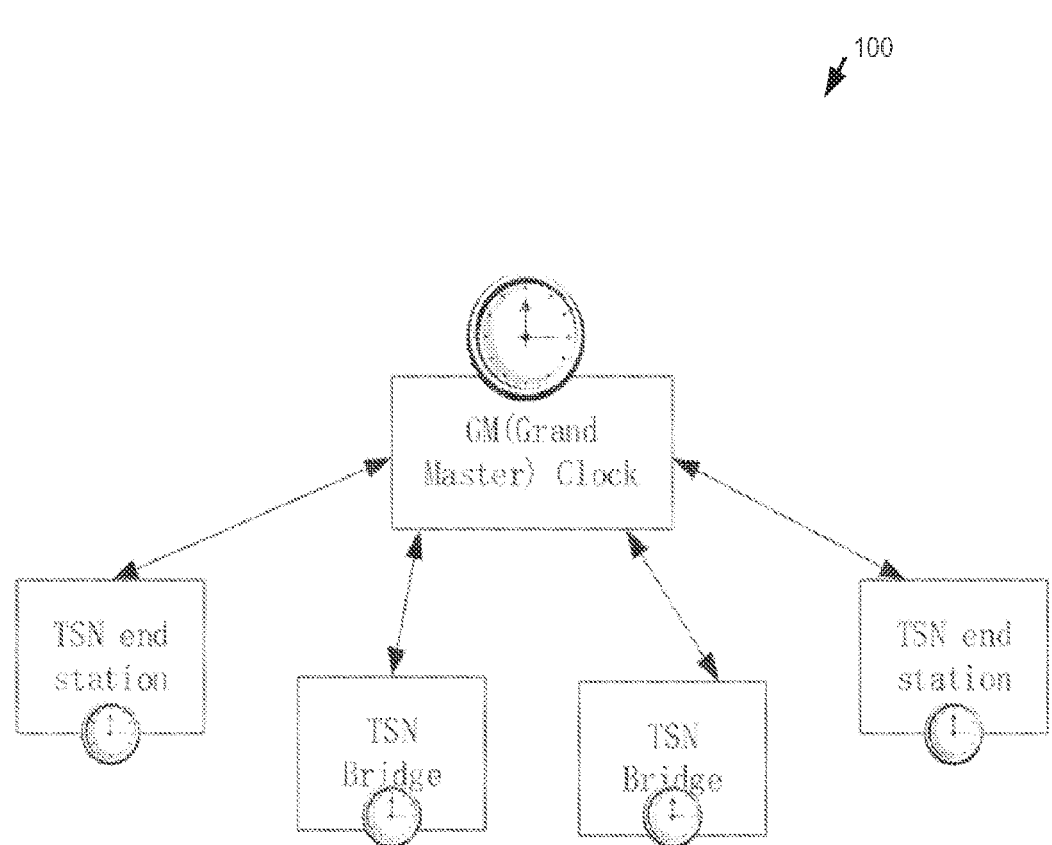
FIG. 1 is a block diagram of an example time synchronization network.

FIG. 1 is a block diagram of an example time synchronization network 100. All the (g)PTP may be multicast frame/packet. i.e., the destination address of frame/packet is multicast address. This may be because there are multi path between two nodes in the network to add the robust. Accordingly, in order to avoid loop of message, the BMCA may be used to create time synchronization tree. Also, if there are multiple GM clock candidate, the BMCA is also used to determine which is selected as the TSN GM clock.

In the every TSN entity, e.g., TSN bridge, there may be a PTP instance to handle the BMCA. In the present embodiments, the TSN entity and PTP instance may be equivalent.

Figure 2:
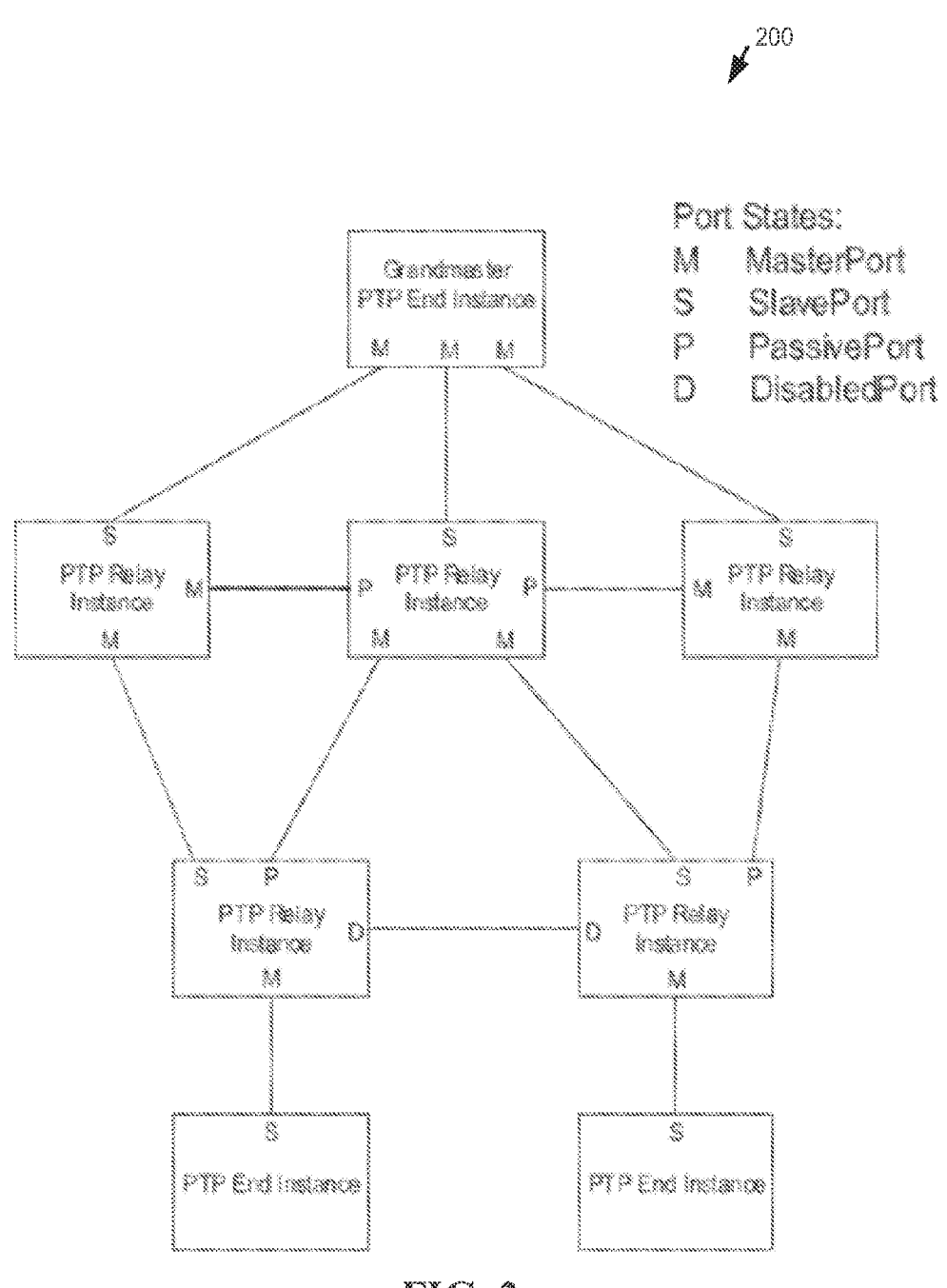
FIG. 2 is a block diagram of an example time synchronization spanning tree.

FIG. 2 is a block diagram of an example time synchronization spanning tree 200. A state of every port in the entity can include any of a plurality of state types. For instance, all the ports in the GM clock entity can be master ports. In some instances, there is only one slave port in the node except GM clock entity. In some instances, there are one or more master ports, and/or passive port, and/or disable port in the PTP relay node. In some instances, the GM clock node can send an Announce message to all the Master node.

For the other TSN entity, when it receives the Announce message, it can run BMCA to determine the port state. If the entity receives the Announce message in the Slave Port, it may only send it out in all ports which state is Master. If the entity receives the Announce message in the Passive or Disable Port, it can discard it. Accordingly, there may be no message loop.

Figure 3:
FIG. 3 is a block diagram of an example 5GS support TSN as a virtual TSN bridge.
Figure 3:
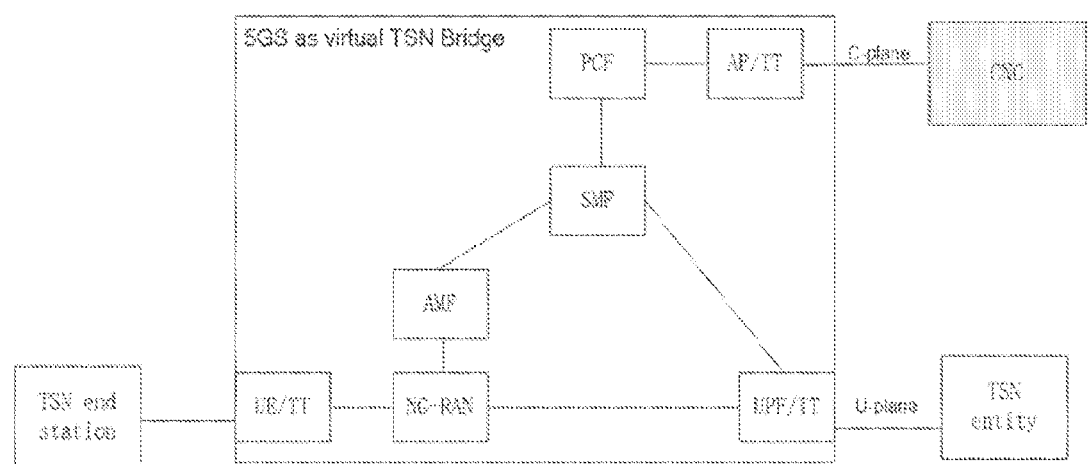

FIG. 3 is a block diagram 300 of an example 5GS support TSN as a virtual TSN bridge. In the 3GPP, it is agreed the 5G system simulates a TSN bridge to a TSN network, so called virtual/logical TSN bridge mode. This "logical" TSN Bridge can include a TSN Translator (TT) functionality for interoperation between TSN System and 5G System both for user plane (UPF/TT) and control plane (AF/TT). 5G System specific procedures in 5GC and RAN, wireless communication links, etc. can remain hidden from the TSN network.

To achieve such transparency to the TSN network, the 5GS can provide TSN ingress and egress ports via the TSN Translator (Device) functionality in the UE side (i.e. DS-TT) and via the "TSN Translator" (CP and UP) functionality on the 5GC side (NW-TT) towards the TSN network.

When the UE/DS-TT request to establish the PDU session for the TSN, the UPF/NW-TT can allocate the unique Bridge Port number for this PDU session. Also, there may be multiple NW-TT ports in the UPF/NW-T in the same 5GS logical bridge.

All these ports can form the ports of the 5GS logical TSN Bridge. However, how the 5GS TSN Bridge implement the dynamic BMCA may be unclear. Specially, how to prevent sending the (g)PTP to the PDU session which port is Passive or Disable may be the main issue.

System Overview

The NW-TT can perform the BMCA process on behalf 5GS logical bridge. When every 5GS logical bridge receives the Announce message, it can forward to NW-TT via U-plane. The NW-T can run the BMCA. When it receives the Announce message, it can determine GM clock, if needed, and the port state of every port in the 5GS logical TSN bridge according to BMCA result. For the bridge port of NW-TT, the NW-TT can determine the behavior internally according to port state.

Example Embodiment 1

The NW-TT/UPF can report the port state of PDU session to SMF. The SMF can create the PDR/FAR for the PDU session which port sole is Passive or Disable, to block the DL (g)PTP message/data packet.

The SMF can pre-install inactive PDR/FAR to the PDU session for the TSN. When the NW-TT/UPF determines the port state is Passive or Disable for the PDU session, it can activate the pre-installed to block the DL (g)PTP message/data packet. When the NW-TT/UPF determines the port state is Master for the PDU session and the pre-install PDR/FAR has been activated, it can de-activate the pre-installed PDR/FAR.

Figure 4:
FIG. 4 is a signaling process of an example method indicating how the 5GS supports BMCA and how the (g)PTP message is prevented from sending to the PDU session which port state is Passive or Disable.
Figure 4:
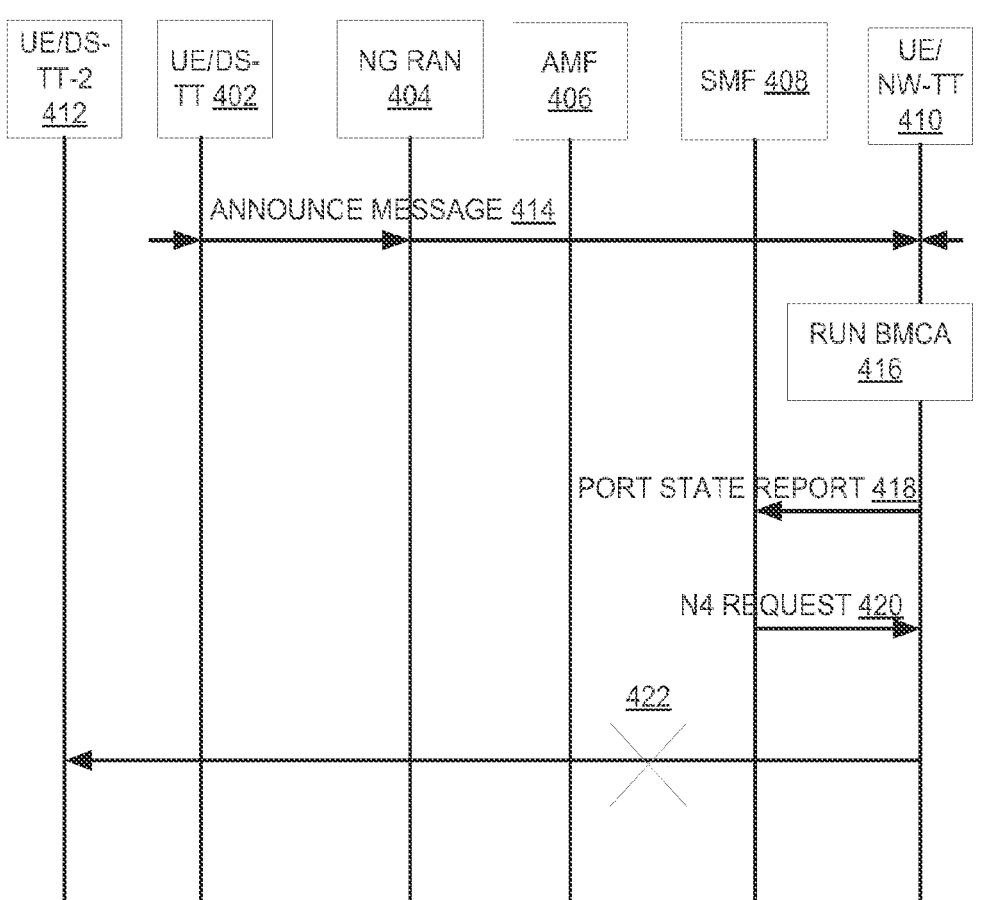

FIG. 4 is a signaling process of an example method 400 indicating how the 5GS supports BMCA and how the (g)PTP message is prevented from sending to the PDU session which port state is Passive or Disable.

At 414, the UE/DS-TT 402 can receive an announce message and forward the message to a NG RAN 404 that can be forwarded to a UE/NE-TT 410. The announce message may be from the NW-TT port or UE/DS-TT via a PDU session.

At 416, the UPF/NW-T 410 can run the BMCA algorithm to determine the GM clock and port state of the 5GS TSN bridge.

At 418, UPF/NW-TT 410 report the port state to SMF 408. It may report the port state of all PDU sessions or report the port state of PDU session which state is Passive or Disable or report the port state of PDU session which state has changed.

At 420, for the PDU session, which port state is Passive or Disable, the SMF 408 can send the N4 request to block the DL (g)PTP message (e.g., it sends PDR/FAR to the UPF/NW-TT 410). The PDR can detect the (g)PTP message by using the destination address of (g)PTP, the action of associated FAR may be discarding the message.

For the PDU session, which port state is Master, and DL (g)PTP message has been blocked before, the SMF 408 can send the N4 request to unblock (e.g., it can remove the PDR/FAR which is used to block the DL (g)PTP message before).

At 422, the port state of PDU session from UE/DS-TT2 is Passive or Disable, the Announce message to UE/DS-TT2 can be discarded by UPF/NW-TT.

Figure 5:
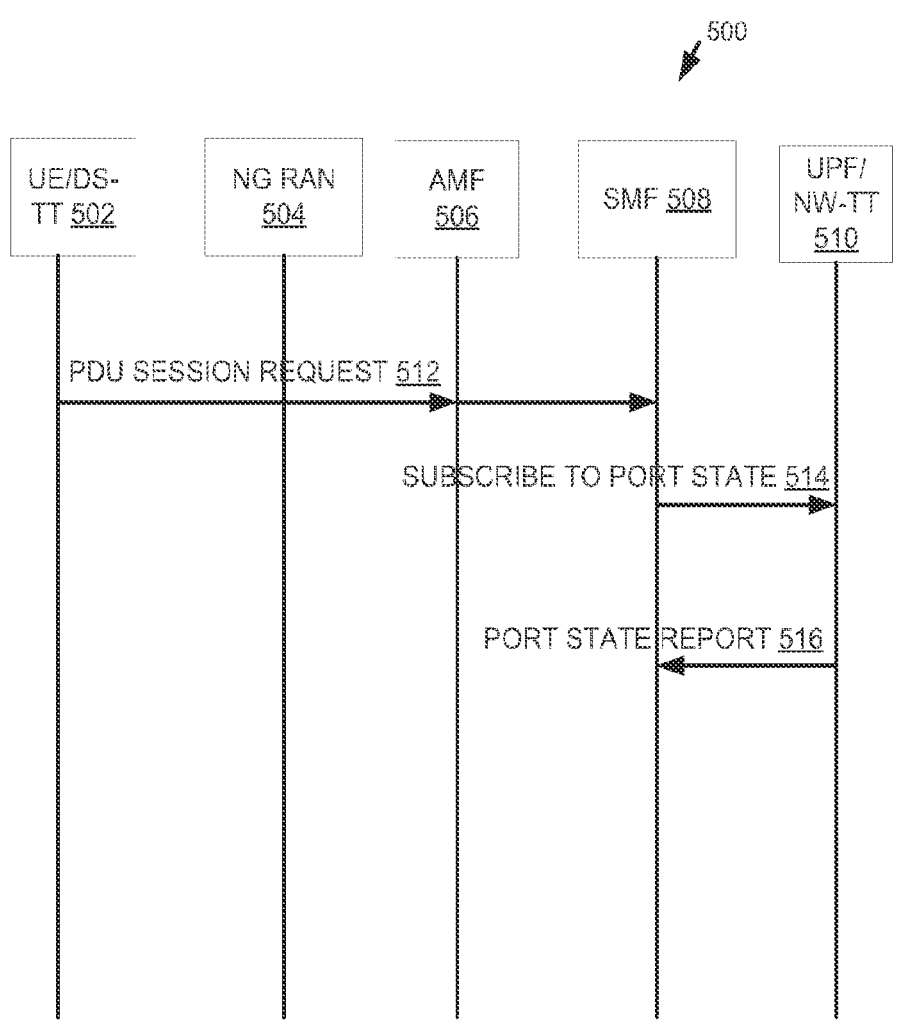
FIG. 5 is a signaling process of an example method for SMF subscribe Port state reporting.

FIG. 5 is a signaling process 500 of an example method for SMF subscribe Port state reporting. FIG. 5 can show the SMF subscribing the UPF/NW-TT to report the port state of the PDU session for TSN.

At 512, UE/DS-TT 502 can request to establish the PDU session for TSN. The SMF 508 can receive the request via AMF 506.

At 514, the SMF 508 can subscribe the Port state with UPF/NW-TT.

At 516, when the UPF/NW-TT 510 can determine the Port state of this PDU session, it report to SMF 508.

Figure 6:
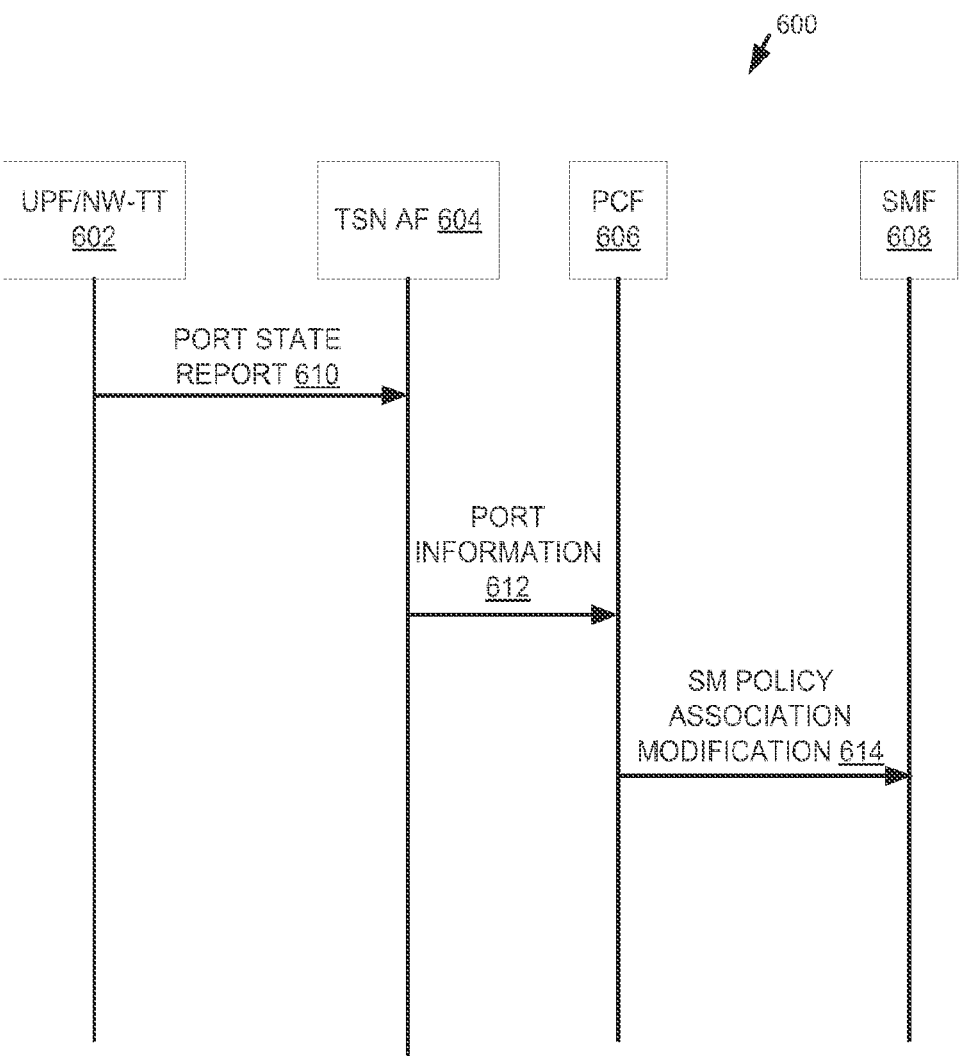
FIG. 6 is an example signaling process for the UPF/W-TT reporting the Port state via TSN AF.

FIG. 6 is an example signaling process 600 for the UPF/W-T reporting the Port state via TSN AF. At 610, when the UPF/NW-TT 602 determines the Port state of this PDU session, it can report to TSN AF 604 in the PMIC. At 612, TSN AF 604 can send the port state to PCF 606. At 614, the PCF 606 can send the port state of the PDU session to SMF 608.

Example Embodiment 2

Figure 7:
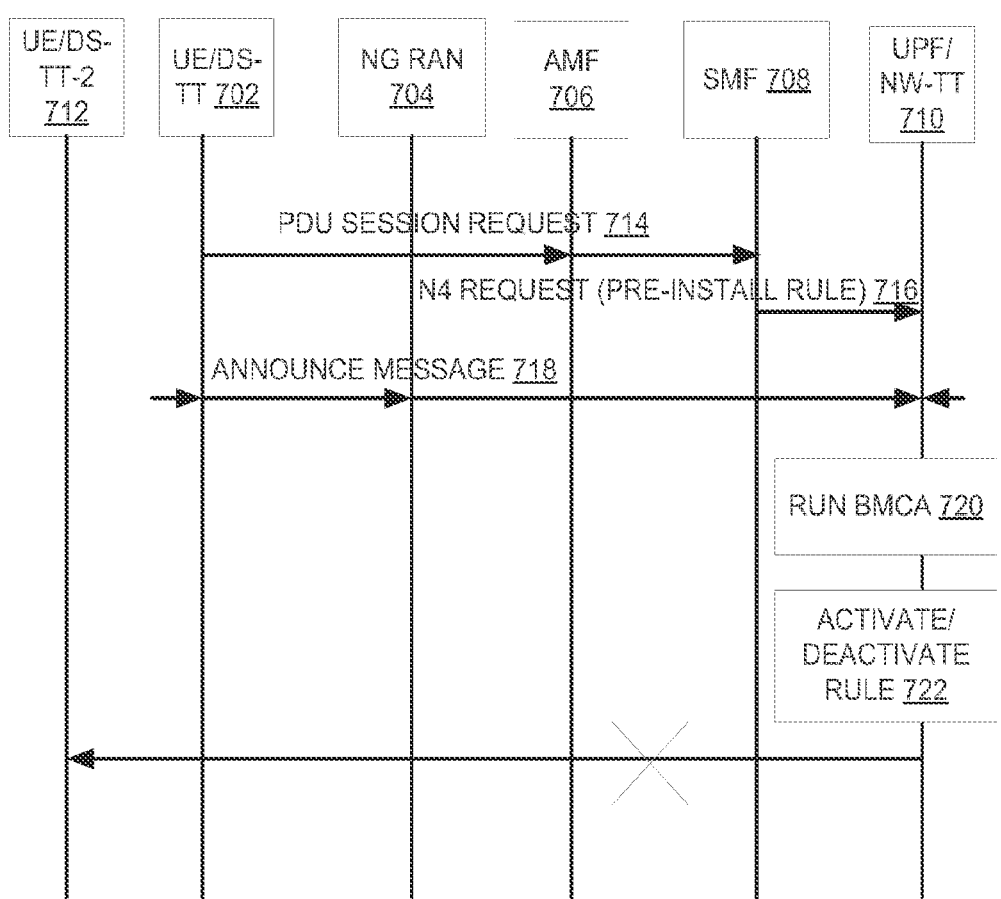
FIG. 7 is an example signaling process for time mapping from TSN clock to 5GS clock.

FIG. 7 is an example signaling process 700 for time mapping from TSN clock to 5GS clock. In some instances, the embodiment can provide how the 5GS support BMCA and how the (g)PTP message is prevented from sending to the PDU session which port state is Passive or Disable.

At 714, the UE/DS-TT 702 can request to establish the PDU session for TSN. The SMF 708 can receive the request via AMF 706.

At 716, the SMF 708 can pre-install the rule to UPF/NW-TT. The pre-installed rule may not be activated in this stage.

At 718, the UPF/NW-TT 710 receives the Announce message. It may from the NW-TT port or from UE/DS-T via PDU session.

At 720, the UPF/NW-TT 710 can run the BMCA algorithm to determine the GM clock and port state of the 5GS TSN bridge.

At 722, for the PDU session, which port state is Passive or Disable, the UPF/NW-TT 710 can activate the pre-install rule if the rule is not activated. The rule may be the PDR/FAR. The PDR can detect the (g)PTP message by using the destination address of (g)PTP, the action of associated FAR is discarding the message.

For the PDU session, which port state is Master, and pre-installed rule has been activated, the UPF/NW-TT can deactivate the pre-install rule. E.g. disable the PDR/FAR which is used to block the DL (g)PTP message before.

At 724, the port state of PDU session from UE/DS-TT2 may be Passive or Disable, the Announce message to UE/DS-TT2 can be discarded by UPF/NW-TT.

The NW-TT perform the BMCA process on behalf 5GS logical bridge. When every 5GS logical bridge receives the Announce message, it can forward to NW-TT via U-plane.

The NW-TT can run the BMCA. When it receives the Announce message, it can determine GM clock, if needed, and the port state of every port in the 5GS logical TSN bridge according to BMCA result.

For the bridge port of NW-TT, the NW-TT can determine the behavior internally according to port state.

In a first exemplary embodiment, a NW-TT/UPF can report the port state of PDU session to SMF. The SMF can create the PDR/FAR for the PDU session which port sole is Passive or Disable, to block the DL (g)PTP message/data packet.

In a second exemplary embodiment, the SMF can pre-install inactive PDR/FAR to the PDU session for the TSN. When the NW-TT/UPF determines the port state is Passive or Disable for the PDU session, it can activate the pre-installed to block the DL (g)PTP message/data packet. When the NW-TT/UPF determines the port state is Master for the PDU session and the pre-install PDR/FAR has been activated, it can de-activate the pre-installed PDR/FAR.

Figure 8:
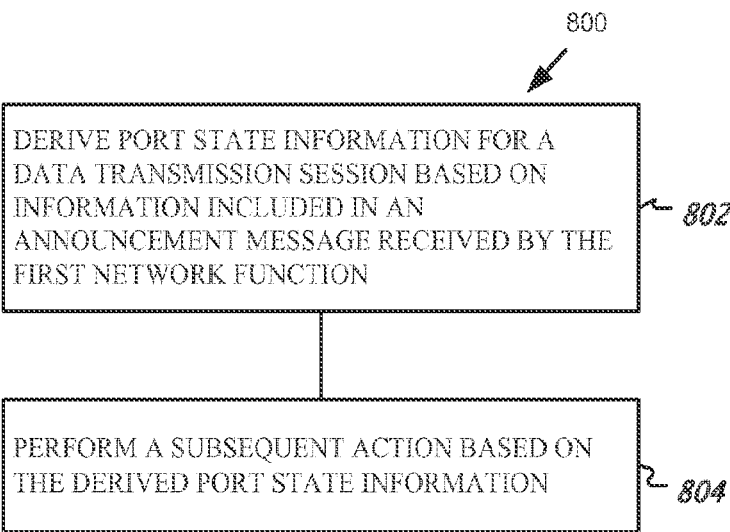
FIG. 8 is a block diagram of an example method for port state handling.

FIG. 8 is a block diagram of an example method 800 for port state handling. In a first exemplary embodiment, a method for data communication comprises deriving, by a first network function, port state information for a data transmission session based on information included in an announcement message received by the first network function (block 802). Port state information can be derived as a BMCA result, as described above. The first network function can include a UPF/NW-TT (e.g., 710) and the second network function can include a SMF (e.g., 708) as described herein.

The method can also include performing, by the first network function, a subsequent action based on the derived port state information (block 804). The subsequent action can include reporting the port state to SMF (e.g., 418) or discarding an announce message (e.g., 422).

In some embodiments, the subsequent action includes transmitting, by the first network function, the derived port state information to a second network function, wherein the derived port state information may include grand master clock data.

In some embodiments, the first network function includes a network-side time sensitive network (TSN) translation function.

In some embodiments, the second network function comprises a session management function (SMF).

In some embodiments, the method includes receiving, by the first network function, a request message from the second network function, the request message including a packet detection rule (PDR) or a forwarding action rule (FAR) for the data transmission session generated by the second network function.

In some embodiments, the method includes blocking, by the first network function, transmission of a downlink packet to a terminal responsive to the port state comprising a disabled state or a passive state using information included in the request message.

In some embodiments, the method includes allowing, by the first network function, transmission of a downlink packet to a terminal responsive to the port state comprising a master state using information included in the request message.

In some embodiments, the data transmission session comprises a protocol data unit (PDU) session.

In some embodiments, deriving the clock data comprises processing data included in the announcement message using a best master clock algorithm (BMCA).

In another exemplary embodiment, a method for data communication includes receiving, by a second network function, port state information from a first network function for a data transmission session, wherein the derived port state information includes grand master clock data. The method can also include sending, by the second network function, a request message to the first network function, the request message including a mule for the data transmission session.

In some embodiments, the rule includes any of a packet detection rule (PDR) or a forwarding action rule (FAR) for the data transmission session generated by the second network function.

In some embodiments, the first network function includes a network-side time sensitive network (TSN) translation function and wherein the second network function comprises a session management function (SMF).

In some embodiments, the first network function is configured to block transmission of a downlink packet to a terminal responsive to the port state comprising a disabled state or Passive state using information included in the request message.

In some embodiments, the first network function is configured to allow transmission of a downlink packet to a terminal responsive to the port state comprising a master state using information included in the request message.

In some embodiments, the method includes receiving, by the second network function, a protocol data unit (PDU) session request message from a terminal, and subscribing, by the second network function, the port state to the first network function to report the port state of the data transmission session for a TSN.

In some embodiments, the method includes receiving, by the second network function, a policy association modification from a policy control function (PCF) indicating the port state for the data transmission session.

In some embodiments, the data transmission session comprises a protocol data unit (PDU) session.

In another exemplary embodiment, a method for data communication comprises deriving, by the first network function, port state information for a data transmission session based on a pre-installed rule received from a second network function. The method can also include performing, by the first network function, either activating or deactivating the pre-installed rule for the data transmission session based on the derived port state information.

In some embodiments, deriving the port state information includes processing data included in an announcement message received by the first network function.

In some embodiments, the pre-installed rule is activated responsive to the port state including a disabled state or a passive state.

In some embodiments, the pre-installed rule includes any of a packet detection rule (PDR) or a forwarding action rule (FAR) for the data transmission session generated by the second network function.

In some embodiments, the method includes detecting, by the first network function, a destination address of a message to be sent to a terminal using the PDR of the pre-installed rule; and discarding, by the first network function, the message to be sent to the terminal using the FAR included in the pre-installed rule.

In some embodiments, the pre-installed rule is deactivated responsive to the port state including a master state.

Example Wireless System

Figure 9:
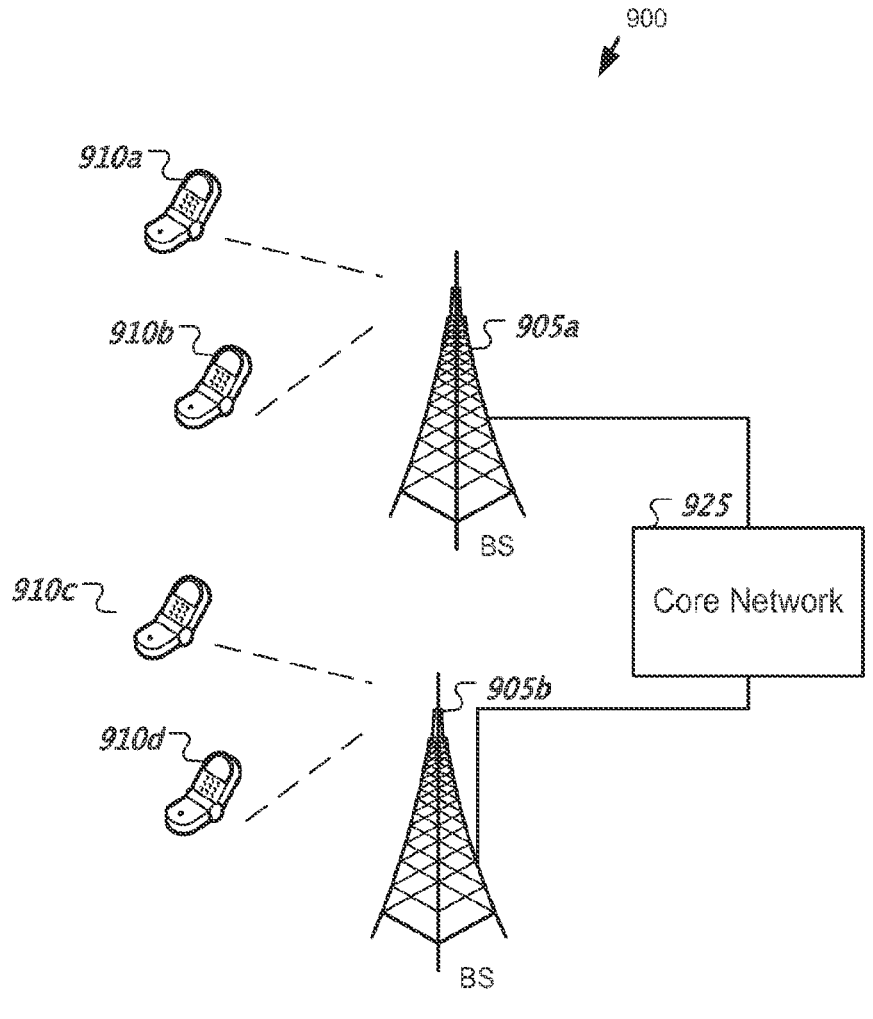
FIG. 9 shows an example of a wireless communication system where techniques in accordance with one or more embodiments of the present technology can be applied.

FIG. 9 shows an example of a wireless communication system where techniques in accordance with one or more embodiments of the present technology can be applied. A wireless communication system 900 can include one or more base stations IBSs) 905a, 905b, one or more wireless devices or terminals 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors. The base station may implement functionalities of a scheduling cell or a candidate cell, as described in the present document.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 10:
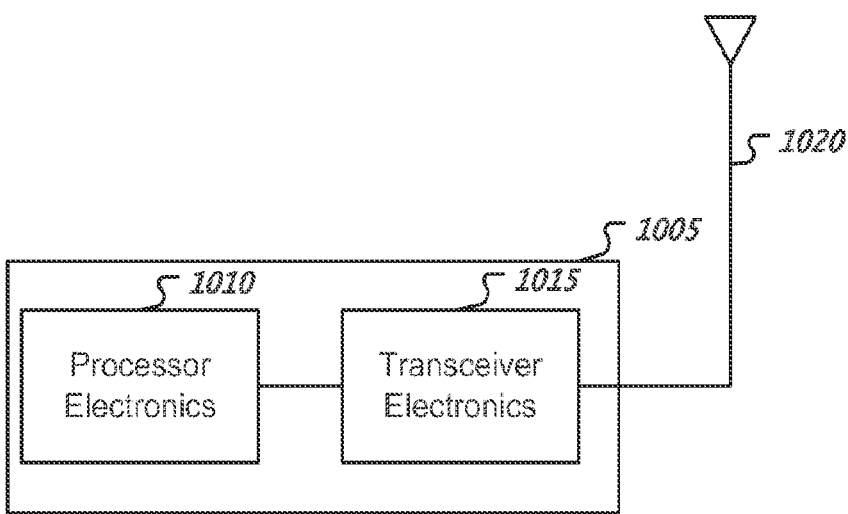
FIG. 10 is a block diagram representation of a portion of a hardware platform.

FIG. 10 is a block diagram representation of a portion of a hardware platform. A hardware platform 1005 such as a network node or a base station or a terminal or a wireless device (or UE) can include processor electronics 1010 such as a microprocessor that implements one or more of the techniques presented in this document. The hardware platform 1005 can include transceiver electronics 1015 to send and/or receive wired or wireless signals over one or more communication interfaces such as antenna 1020 or a wireline interface. The hardware platform 1005 can implement other communication interfaces with defined protocols for transmitting and receiving data. The hardware platform 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or network functions are implemented using the hardware platform 1005.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question. e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for data communication, comprising:

deriving, by a network-side time sensitive network translation (NW-TT) function, port state information for a data transmission session based on information included in an announcement message received by the NW-TT function, wherein the derived port state information includes; grand master clock data and a port state, and wherein the port state comprises a disabled state, a passive state, or a master state;

performing, by the first network function, a subsequent action based on the derived port state information, the subsequent action includes transmitting, by the NW-TT function, the derived port state information to a a session management function (SMF); and in response to transmitting the derived port state information to the SMF, receiving, by the NW-TT function, a request message from the SMF, wherein:

in response to the port state in the derived port state information comprising the disabled state or the passive state, the request message includes a packet detection rule (PDR) or a forwarding action rule (FAR) for the data transmission session generated by the SMF that indicates to the NW-TT to discard a downlink packet to block transmission of the downlink packet to a terminal; and in response to the port state in the derived port state information comprising the master state, the request message includes an indication to remove the PDR or the FAR to allow the transmission of the downlink packet to the terminal; and by the NW-TT function, discarding the downlink packet or allowing the transmission of the downlink packet to the terminal according to the request message.

2. The method of claim 1, wherein
the data transmission session comprises a protocol data unit (PDU) session.

3. The method of claim 1, wherein
deriving the port state information comprising the grant master clock data comprises processing data included in the announcement message using a best master clock algorithm (BMCA).

4. A method for data communication, comprising:

receiving, by a session management function, port state information from a network-side time sensitive network translation (NW-TT) function for a data transmission session, wherein the port state information is derived based on information included in an announcement message received by the NW-TT function, wherein the port state information includes grand master clock data and a port state, and wherein the port state comprises a disabled state, a passive state, or a master state; and in response to receiving the port state information, sending, by the session management function, a request message to the NW-TT function, wherein:

in response to the port state comprising the disabled state or the passive state, the request message includes a packet detection rule (PDR) or a forwarding action rule (FAR) for the data transmission session that indicates to the NW-TT to discard a downlink packet to block transmission of the downlink packet to a terminal; and in response to the port state comprising the master state, the request message includes an indication to remove the PDR or the FAR to allow the transmission of the downlink packet to the terminal.

5. The method of claim 4, wherein the port state is received by the session manage-
ment function via a policy association modification
from a policy control function (PCF) indicating the port
state for the data transmission session.

6. A non-transitory computer readable medium having
code stored thereon, the code when executed by a processor,
configures the processor to implement the method recited in
claim 1.

\* \* \* \* \*